3,335,032
METHOD OF MANUFACTURING BATTERY
PLATES
Stanley Charles Barnes, Kenilworth and Donald Henry Morrell, Sutton Coldfield, England, and John Armstrong, Oakville, Ontario, Canada, assignors to Joseph Lucas (Industries) Limited, Birmingham, England
No Drawing. Filed July 14, 1966, Ser. No. 565,081
4 Claims. (Cl. 136—20)

This application is a continuation-in-part of our application No. 398,384 filed Sept. 22, 1964, now abandoned.

This invention relates to battery plates of the kind comprising a lead grid covered with a paste the nature of which depends on whether the plate is to be used as a positive plate or a negative plate.

It is conventional to make the grid of such a battery plate by casting, and to add antimony to the grid to increase its strength. We have found that since antimony and lead cannot be perfectly mixed, the grid will include lead-rich areas and antimony-rich areas. In use in a battery, current ends to flow through the electrolyte in the paste from the lead-rich to the antimony-rich areas with a resultant corrosion of the lead-rich areas to lead oxide or lead sulphate and reduction of oxygen at the antimony-rich areas. This process, which occurs by chance as a result of the presence of the antimony, has been found to have an advantageous effect because the lead oxide or lead sulphate produced at the lead-rich areas is firmly secured to the grid and acts as a key for the paste, so improving the adhesion of the paste to the grid. However, in order for the anodic reaction to take place at the lead-rich areas, the corresponding cathodic reaction must take place at the antimony-rich areas. Although the cathodic reaction does take place, it is slow, partly because antimony is not a good catalyst for the reduction of oxygen, and partly because of the time taken for the oxygen to diffuse through the paste. Nevertheless, even though the cathodic reaction is slow, some advantage is obtained with conventional cast grids.

Although cast grids have been used for many years, there are considerable advantages to be gained by using grids formed from dispersion strengthened lead (i.e., lead having therein lead oxide to increase its strength). We have discovered during research on such grids, however, that grids formed from dispersion strengthened lead do not undergo the reactions referred to in the previous paragraph, and for this reason are less efficient than might be expected. It is this realisation that has led us to our present inventive concept, which is the incorporation in at least the surface of the grid of a compound which is cathodic with respect to lead in the presence of the electrolyte contained within the paste and which will take part in the cathodic reaction associated with flow of current from lead-rich areas in the grid to said compound.

The compound which will be chemically active is preferably lead dioxide. The dioxide can be incorporated into the grid by rolling powdered dioxide into the surface, or by rolling a mixture of dispersion strengthened lead and lead dioxide powder or by forming a dispersion strengthened lead grid and oxidising the surface thereof anodically or chemically.

In one example a grid was formed from dispersion strengthened lead in any convenient known manner and coated with paste, the nature of the paste depending on whether a positive or a negative battery plate was being formed. Before coating, the surface of the grid was anodised so that about 0.5% by weight of lead dioxide was present in the grid, 0.5% being the preferred figure but useful results being obtained in the range of 0.1% to 3%.

We are aware that it has been proposed in the past to incorporate lead dioxide in battery paste, although the paste was not placed on a grid formed from dispersion strengthened lead, and the dioxide was not for the same purpose as in our invention.

It should be clearly understood that in our concept the lead dioxide or other compound is incorporated in at least the surface of the grid before the grid is pasted. It is not satisfactory to incorporate the compound we require in the paste because there is no guarantee that the compound, if in the paste, will appear after pasting on the surface of the grid, so that the required reactions may very well not take place. Even more important, the incorporation of lead dioxide in the paste means that the paste is suitable only for a positive plate, and cannot be used for a negative plate. In our concept, on the other hand, the lead dioxide or other compound is not in the paste, and so the appropriate paste can be added to our grid to form a positive plate or a negative plate.

In another example, 0.5% by weight of lead dioxide of particle size less than 45 microns was mixed in a known device termed a cone blender for 15 minutes with lead powder containing 2.5% by weight lead oxide present in the form of a thin skin around the particles of lead. The lead powder had a particle size analysis as follows:

| Microns: | Percent |
|---|---|
| Above 250 | 3.5 |
| 250–150 | 12.4 |
| 150–105 | 17.6 |
| 105–76 | 28.6 |
| 76–63 | 15.2 |
| 63–45 | 10.5 |
| Below 45 | 12.2 |

The mixed powder was next passed through a powder rolling mill and so formed into sheets, the sheets then being passed through patterned rolls to form the required grid shapes. The grids were pasted with a paste having constituents dependent on whether a positive plate or a negative plate is being formed.

Although in this example the lead dioxide is dispersed throughout the grid, sufficient lead dioxide is present on the grid surface to cause the desired reaction to take place. As previously explained, it would not be satisfactory to have the lead dioxide in the paste because the paste could only be used for a positive plate, and also even in the case of a positive plate the lack of any lead dioxide particles firmly entrenched in the grid would render the process unreliable. It will be understood that since we achieve our objective by treatment of the grid alone, we can form a plurality of grids, cover some of them with a positive paste, cover the remainder with a negative paste, and then assemble the positive and negative plates thus formed into a lead-acid secondary battery by known techniques.

Although lead dioxide is the preferred material for incorporation in the grid, the benefits of our invention can be obtained by using other compounds which are cathodic with respect to lead in the presence of the electrolyte contained within the paste. Examples of other suitable materials are mercuric oxide and manganese dioxide. Naturally an expert would choose a compound which has no adverse effects on the grid or plate.

Having thus described our invention what we claim as new and desire to secure by Letters Patent is:

1. A method of manufacturing a battery plate having a grid, formed from dispersion-strengthened lead, covered with a paste, said paste containing electrolyte, comprising the step of incorporating in at least the surface of the grid, prior to application of paste to the grid, a compound which is cathodic with respect to lead in the presence of said electrolyte, said compound being selected from the group consisting of lead dioxide, manganese dioxide and mercuric oxide and taking part in the cathodic reaction associated with flow of current from areas of the grid which are rich in lead to said compound, and applying said paste to the coated grid.

2. A method as claimed in claim 1 in which said compound is mercuric oxide.

3. A method as claimed in claim 1 in which said compound is manganese dioxide.

4. A method as claimed in claim 1 in which said compound is lead dioxide and is present in proportions between 0.1% and 3% by weight.

References Cited
UNITED STATES PATENTS

| | | | |
|---|---|---|---|
| 434,458 | 8/1890 | Pepper | 136—27 |
| 2,422,437 | 6/1947 | Plews et al. | 136—27 |
| 2,728,808 | 12/1955 | Koerner et al. | 136—27 |
| 2,902,530 | 9/1959 | Eisen | 136—20 |
| 3,098,293 | 7/1963 | Ebdon. | |

OTHER REFERENCES

Vinal: Storage Batteries, 4th ed., 1955, p. 22.

WINSTON A. DOUGLAS, *Primary Examiner.*

B. J. OHLENDORF, A. SKAPARS, *Assistant Examiners.*